Dec. 2, 1969 W. E. PETERSON 3,482,081
SELF-CONTROLLED VARIABLE TIME BASE TAPE PROGRAMMER
Filed Aug. 4, 1965

INVENTOR.
WALTER E. PETERSON 3,482,081
Patented Dec. 2, 1969

3,482,081

SELF-CONTROLLED VARIABLE TIME BASE TAPE PROGRAMMER

Walter E. Peterson, Monterey Park, Calif., assignor to International Telephone and Telegraph Corporation, New York, N.Y., a corporation of Maryland Filed Aug. 4, 1965, Ser. No. 477,272
Int. Cl. G06k 7/00; H01h 43/08
U.S. Cl. 235—61.11 8 Claims

ABSTRACT OF THE DISCLOSURE

The invention includes a pulse generator which operates a stepper motor to move a punched tape past a set of read heads. The tape contains a program in binary code. A resistor ladder connected by switches is operated in accordance with the readout. The output of the resistor ladder is impressed upon the pulse generator to control the pulse repetition frequency thereof. The stepping frequency of the tape is thus determined by the tape program itself.

This invention relates generally to programming devices and more particularly to a novel tape programmer in which the speed of the tape is controlled by a program on the tape so that a self-controlled variable time base signal results.

Tapes bearing coded information for programming various operations are well known in the art. All such programs, however, are derived from tapes driven at a constant speed, and any modulated time base included in the information signal recorded on the tape. In instances wherein a desired output signal is to remain constant for a long period of time, the continuous operation of the tape is wasteful and inefficient in that the same signal is being derived from the tape throughout the period at which the signal is at a constant or sustained value.

With the foregoing in mind, it is a primary object of this invention to provide a desired variable time base for an output signal by varying the actual speed of operation of the tape providing the output signal to the end that the physical tape itself is employed to maximum efficiency.

More particularly, it is an object to provide a novel self-controlled tape programmer in which an output signal varying between various voltage levels is provided and wherein the rate of change of this output signal from one such voltage to another is automatically effected by varying the actual physical speed of tape movement in accordance with a signal on the tape.

Briefly, these and other objects and advantages of this invention are attained by providing a stepper motor for driving a tape including coded information for controlling an output signal. The rate at which the stepper motor moves the tape is controlled by the rate at which pulses are provided to the stepper motor per unit time. This pulse rate in turn is varied in accordance with a coded information signal on the tape itself so that the speed of the tape is adjusted by coded information on the tape.

With the foregoing arrangement, it is possible to slow considerably the movement of the tape when an output signal is to remain relatively constant over a long period of time. One the other hand, when the output signal is programmed to change relatively rapidly, then the tape speed is appropriately increased to effect such change.

Figure 1:
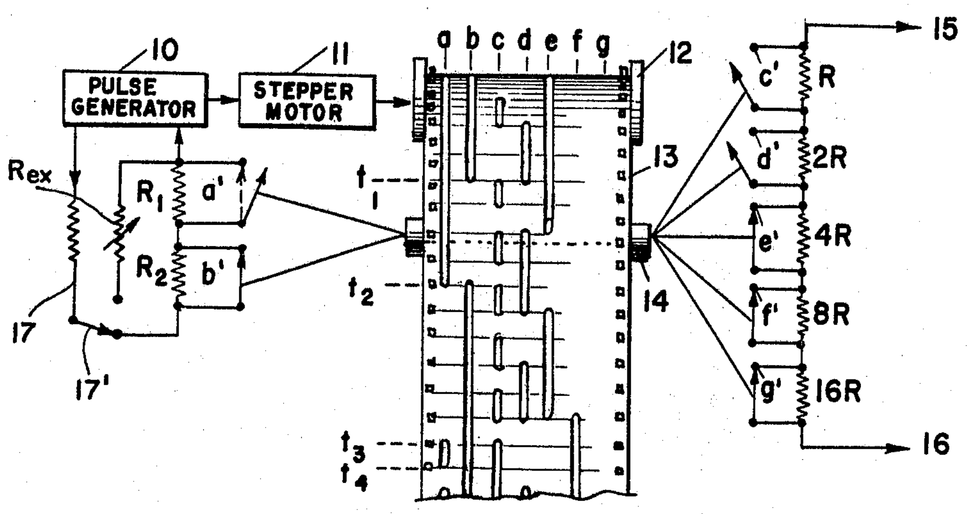
Figure 2:
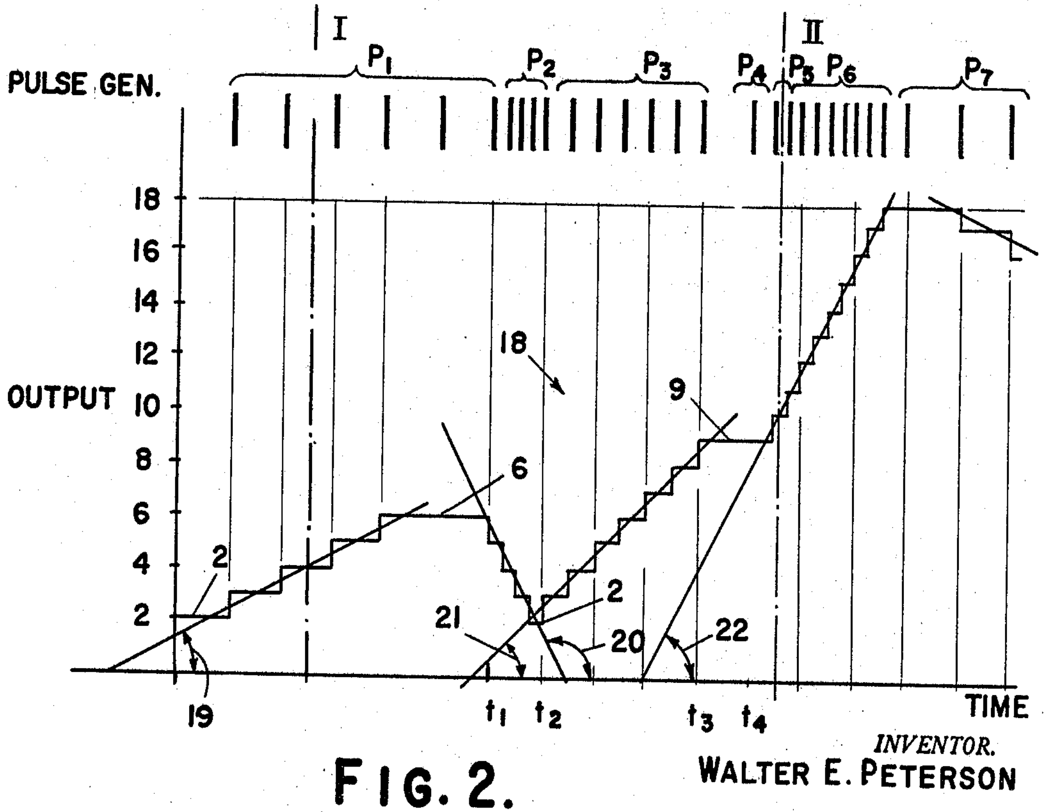

A better understanding of the invention will be had by referring to the accompanying drawings, in which:

FIGURE 1 is a schematic diagram partly in block form illustrating one example of the tape programmer of the invention; and FIGURE 2 represents an output signal having a variable time base provided by the coded program appearing on the tape shown in FIGURE 1.

Referring first to FIGURE 1, there is illustrated a pulse generator 10 for providing a train of pulses, a stepper motor 11, and a tape drive sprocket 12 coupled to the stepper motor 11 for rotation thereby through discrete distances in response to each pulse received from the pulse generator 10. A tape 13 passes over the sprocket 12 and includes a predetermined coded program which, in the particular example chosen for illustrative purposes, is in the form of binary codes extending transversely across the tape.

As readout means indicated schematically at 14 is arranged to actuate a plurality of switches in accordance with the particular binary coded signal on the tape 13 passing over the readout 14. For example, the successive positioned notation for the transverse binary codes on the tape fall in longitudinal alignment or tracks designated generally *a*, *b*, *c*, *d*, *e*, *f*, and *g*. A portion of this coded program is defined by the tracks *c*, *d*, *e*, *f*, and *g* and any coded signal appearing in these tracks in the form of the elongated slots in the tape will serve to operate one of the switches designated by the same letter followed by a prime such as indicated at *c'*, *d'*, *e'*, *f'*, and *g'*. Thus, in the particular position illustrated in FIGURE 1, the switches *c'* and *d'* are shown in open position as a consequence of the slot portions on the tape 13 appearing in the tracks *c* and *d* immediately over the readout device 14. Each switch remains open for the duration of its corresponding slot as the tape moves.

As shown, the various switches *c'*, *d'*, *e'*, *f'*, and *g'* are arranged to shunt respectively a series of resistances R, 2R, 4R, 8R and 16R. Each resistance in this series is twice the value of the preceding resistance to provide a binary structure. The opposite ends of the series circuit 15 and 16 may be connected into any suitable output circuit to provide an output signal whose magnitude is a function of the total resistance in the resistance circuit between the ends 15 and 16. The total value of the resistance between leads 15 and 16 will depend upon which ones of the various switches are caused to be opened or closed by the signals on the tape 13.

In accordance with a primary feature of this invention, the coded program includes another portion in the form of a binary code included within the first two tracks *a* and *b* illustrated adjacent the lefthand portion of the tape 13 of FIGURE 1. The readout device 14 for this other portion of the coded program is arranged to operate switches labeled *a'* and *b'* in conjunction with a control means for determining the rate of pulse generation by the pulse generator 10.

This control may be effected by changing the resistance in a resistance path 17 incorporated in the pulse generator 10 wherein the rate of generation of pulses depends upon the total resistance in the path 17. For example, in the event the pulse generator employs a multi-vibrator and differentiating circuit to provide the pulses, the rate of operation or frequency of the multi-vibrator may be controlled by the resistance in one of the condenser discharge paths. Thus, by making path 17 one of the discharge paths and changing its resistance, the rate of generation of pulses in the pulse generator 10 will be changed to vary the rate of rotation of the stepper motor 11 and thus vary the rate of movement of the tape 13. The tape 13 thus includes its own coded program for determining its own rate of movement.

The foregoing feature provides an enormous advantage in that the tape need only be moved at that rate of speed best suited for the particular function of the output signal.

As a specific example and with reference to FIGURE 2, assume that it is desired to program an output signal substantially as indicated by the plot 18. As shown, this signal changes from 2 to 6 at a rate determined by the slope angle 19. The signal stays at 6 for a given period then decreases at a relatively rapid rate back to 2 as indicated by the slope angle 20. From 2, the signal increases to 9 at an intermediate rate as defined by the slope angle 21. After staying at 9 for a given period, the signal then rapidly increases as indicated by the slope angle 22.

It is seen that the function depicted in FIGURE 2 has a variable time base which is evident from the fact that when the magnitude changes from one level to another, the rate of change is not necessarily the same. While this entire program could be provided on a conventional tape which is moved at a constant speed, by employing the unique variable time base tape programmer of FIGURE 1, the same output signal may be provided with considerably less length of tape. This is a direct consequence of driving the tape physically at different speeds in accordance with the variable time base.

To understand the operation, the tape of FIGURE 1 has been designated at various transverse points by the letters $t_1$, $t_2$, $t_3$, and $t_4$ corresponding to similarly designated times in FIGURE 2 at which various voltage output levels are realized. A portion of the tape visible in FIGURE 1 covers the curve 18 between the vertical dash-dot lines I and II and the correspondence between the output signal and the slotted binary signals on the tape of FIGURE 1 will be evident.

For example, at the time $t_1$, there is a change in the code in the tracks *a* and *b* of the tape of FIGURE 1 wherein both switches *a'* and *b'* were open to the situation in which only the switch *a'* is opened. When both switches *a'* and *b'* were open, the resistance in the resistance path 17 included both the resistances R1 and R2 and thus was maximum. For this resistance value, it is assumed that the number of pulses per unit time is minimum as indicated by the pulses $P_1$ in FIGURE 2. Also, assuming that the resistance R2 is greater than the resistance R1, it will be clear that with only the switch *a'* open to only insert R1 in the resistance path 17, there is less total resistance than would be the case if only the resistance R2 were inserted. The pulse rate is thereby greatly increased, this pulse rate being an inverse function of the resistance in the circuit 17. The increased pulse rate is indicated by the pulses $P_2$ in FIGURE 2 and the tape will move approximately four times as fast to change back from the voltage output of 6 to 2.

In the meantime, it should be understood that the various coded signals in the tracks *c*, *d*, *e*, *f*, and *g* operate respectively the switches *c'*, *d'*, *e'*, *f'*, and *g'* to insert or remove resistances between the output leads 15 and 16. If the resistance R is deemed a unit resistance, then the magnitude of the output signal is given by the sum of resistances actually in the circuit. Thus, at the particular position of the readout 14 illustrated in FIGURE 1 the tracks *c* and *d* include signals therein opening switches *c'* and *d'* so that the total resistance in the circuit is 3R. If R is unit, this corresponds to the level 3 which exists just prior to the time $t_2$ as illustrated in FIGURE 2. One simple means of deriving a variable voltage output signal between the leads 15 and 16 would be to place a constant current generator between the leads 15 and 16 so that the voltage between these leads will vary in a direct manner with the total resistance therebetween.

At the time $t_2$, it will be noticed that the switch *b'* is open and *a'* closed, inserting a somewhat higher resistance in the resistance path 17. This will slow down the pulse generation rate to a value intermediate the pulse rate when both switches *a'* and *b'* are open and when only *a'* is open. The series of pulses for operating the stepper motor 11 then are shown at $P_3$ in FIGURE 2 and will cause a sequential change in the output signal as indicated by the steps up to 9. Reference to the tape at the time $t_3$ and $t_4$ will indicate that the tracks *c* and *f* are energized opening the switches *c'* and *f'* to insert a total of 9R resistance which corresponds to this value of 9. Also, at the time $t_4$, the other coded portion controlling the resistance path 17 and thus pulse generation rate, switches back so that *a'* is opened and *b'* closed to provide the pulses $P_4$ and $P_5$.

It will thus be evident that when the output signal is to remain at a given level for a given period of time, the tape is driven more slowly than is the case when a rapid change is desired.

While mechanical switch type arms have been shown as being responsive to the readout means 14 in the particular example set forth, it should be understood that solid state switching can be effected by the use of transistors, diodes, or equivalent electronic type switches. Further, while the binary code only includes a few tracks, it should be understood that any signal on the tape 13 may include many additional tracks. Moreover, it will, of course, be understood that the pulse generation rate may be varied through a far greater range than that merely depicted for illustrative purposes.

In FIGURE 1, it will be noted that the resistance path 17 includes a switch arm 17' adapted to disconnect the resistances R1 and R2 from the path and connect an external control resistance R*ex* into the path when moved from its solid to its dotted line position. By this arrangement, the number of pulses supplied per unit time to the stepper motor may be externally controlled independently of the code on the tape should such be desired.

The self-controlled variable time base tape programmer is accordingly not to be thought of as limited to the one particular example set forth merely for illustrative purposes.

What is claimed is:

1. A self-controlled variable time base tape programmer comprising, in combination: a tape; means for driving said tape; a coded program on said tape; means for changing an output signal in accordance with a portion of said program; and, means for providing a control signal connected to said means for driving said tape to control the speed at which said tape is driven, said means for driving said tape comprising a pulse generator and a stepper motor connected to said tape and driven by pulses from said pulse generator, said control signal controlling the number of pulses generated per unit time by said pulse generator.

2. A self-controlled variable time base tape programmer comprising, in combination: a pulse generator; a stepper motor connected to receive pulses from said pulse generator; a tape drive connected to said stepper motor for movement through a discrete distance by said stepper motor in response to each pulse; a tape driven by said tape drive and including a pre-determined coded program; a readout means for said tape; an output circuit connected to said readout means for deriving an output signal having an amplitude which varies with respect to time in accordance with a portion of said coded program; and, a pulse rate generation control means connected to said pulse generator and to said readout means and responsive to another portion of said coded program for varying the number of pulses passed to said stepper motor per unit time whereby the speed at which said tape is moved is controlled by said another portion of said coded program on said tape to control the rate of change of said output signal from one amplitude to another.

3. A programmer according to claim 2, in which said output circuit includes: a plurality of series connected resistances, each successive resistance having twice the value of its preceding resistance; and, a plurality of switches connected respectively across said resistances, said portion of said coded program on said tape comprising a binary code for effecting the opening of various ones of said switches to vary the overall resistance of said output circuit in accordance with said binary code.

4. A programmer according to claim 3, in which said pulse generator has a pulse generation rate controlled by the value of resistance in a resistance path, said pulse rate generation means including series resistances connected in said path and switches for selectively shunting out said resistances, said another portion of said coded program on said tape comprising a binary code for effecting opening of various ones of said latter-mentioned switches to vary the pulse generation rate in accordance with said latter-mentioned binary code.

5. In a program controlled mechanism, the combination comprising: a record storage device containing a predetermined program; read means to produce an output signal in accordance with said program during a corresponding interrogate interval of time; a stepping device actuable to operate said storage device and said read means to change from reading one portion of said program to another portion during a changeover interval of time, the rate of change in reading with respect to time produced by said stepping device being substantially larger than zero during said changeover interval, said rate of change of reading being zero during said interrogate interval; and means for actuating said stepping device in accordance with said output signal.

6. The invention as defined in claim 5, wherein said storage device is a record medium, said stepping device being a stepper motor to advance said medium past said read means.

7. In a program controlled mechanism, the combination comprising: a recording medium containing a predetermined program; read means to produce an output signal in accordance with said program; a stepper motor actuable to produce relative motion between said medium and said read means, said motion being in individual and discrete steps; and source means responsive to said output signal for actuating said stepper motor in accordance therewith, said stepper motor being adapted to move said record medium past said read means, said source means including a pulse generator having a pulse repetition frequency directly proportional to said output signal.

8. In a program controlled mechanism, the combination comprising: a recording medium containing a predetermined program; read means to produce an output signal in accordance with said program; a stepper motor actuable to produce relative motion between said medium and said read means, said motion being in individual and discrete steps; and source means responsive to said output signal for actuating said stepper motor in accordance therewith, said source means including a pulse generator having a pulse repetition frequency directly proportional to said output signal.

References Cited

UNITED STATES PATENTS

| | | | |
|---|---|---|---|
| 2,656,109 | 10/1953 | Lindars. | |
| 2,672,287 | 3/1954 | Reitfort | 235—61.9 X |
| 2,684,746 | 7/1954 | Bakelaar et al. | 235—61.9 X |
| 2,995,691 | 8/1961 | Kennard et al. | |
| 3,164,731 | 1/1965 | Long | 235—61.11 X |
| 3,335,297 | 8/1967 | Englund et al. | 307—112 |
| 3,345,500 | 10/1967 | Russell | 235—61.11 |

DARYL W. COOK, Primary Examiner

U.S. Cl. X.R.

200—46; 307—141.4